United States Patent
Takita

(10) Patent No.: US 10,399,389 B2
(45) Date of Patent: Sep. 3, 2019

(54) PNEUMATIC TIRE

(71) Applicant: TOYO TIRE & RUBBER CO., LTD., Osaka-shi, Osaka (JP)

(72) Inventor: Kouichi Takita, Osaka (JP)

(73) Assignee: TOYO TIRE CORPORATION, Itami-shi, Hyogo (JP)

( * ) Notice: Subject to any disclaimer, the term of this patent is extended or adjusted under 35 U.S.C. 154(b) by 279 days.

(21) Appl. No.: 15/348,048

(22) Filed: Nov. 10, 2016

(65) Prior Publication Data
US 2017/0157988 A1  Jun. 8, 2017

(30) Foreign Application Priority Data
Dec. 4, 2015  (JP) .................................. 2015-237477

(51) Int. Cl.
*B60C 11/03* (2006.01)
*B60C 11/13* (2006.01)

(52) U.S. Cl.
CPC ...... *B60C 11/0306* (2013.01); *B60C 11/0332* (2013.01); *B60C 11/1307* (2013.01); *B60C 2011/0341* (2013.01); *B60C 2011/0358* (2013.01)

(58) Field of Classification Search
None
See application file for complete search history.

(56) References Cited

U.S. PATENT DOCUMENTS

| 5,078,190 A | * | 1/1992 | Wissbrock | B60C 11/0318 152/902 |
| 2004/0221936 A1 | * | 11/2004 | Kaiser | B60C 1/00 152/209.1 |
| 2008/0110541 A1 | * | 5/2008 | Sueishi | B60C 11/11 152/209.15 |
| 2010/0236678 A1 | * | 9/2010 | Sueishi | B60C 11/032 152/209.15 |
| 2012/0132335 A1 | * | 5/2012 | Fujita | B60C 11/11 152/209.18 |
| 2012/0160381 A1 | * | 6/2012 | Ishida | B60C 11/11 152/209.11 |
| 2012/0305154 A1 | * | 12/2012 | Hikita | B60C 11/11 152/209.11 |

(Continued)

FOREIGN PATENT DOCUMENTS

| JP | 8-127206 A | 5/1996 |
| JP | 2003-165311 A | 6/2003 |
| JP | 2003-341305 A | 12/2003 |

*Primary Examiner* — Jodi C Franklin
(74) *Attorney, Agent, or Firm* — Westerman, Hattori, Daniels & Adrian, LLP

(57) ABSTRACT

The present invention provides a pneumatic tire having excellent traction performance and excellent non-uniform wear resistance. In the pneumatic tire, a plurality of blocks are formed by a plurality of main grooves extending in a tire circumferential direction and a plurality of transverse grooves extending in a tire width direction. A first block and a second block disposed adjacently to each other in the tire circumferential direction are formed as one set, and a surface area of the second block is set larger than a surface area of the first block. The second block is arranged so as to be displaced a position of the second block from a position of the first block toward the inside in the tire width direction.

12 Claims, 2 Drawing Sheets

(56) References Cited

U.S. PATENT DOCUMENTS

| | | | |
|---|---|---|---|
| 2013/0068359 A1* | 3/2013 | Suita | B60C 11/01 152/209.16 |
| 2014/0318675 A1* | 10/2014 | Chen | B60C 11/11 152/209.11 |
| 2015/0283864 A1* | 10/2015 | Niwa | B60C 13/002 152/541 |

* cited by examiner

PNEUMATIC TIRE

CROSS-REFERENCE TO RELATED APPLICATIONS

This application claims priority from Japanese Patent Application No. 2015-237477 filed on Dec. 4, 2015, the disclosure of which is incorporated herein by reference in their entireties.

BACKGROUND OF THE INVENTION

The present invention relates to a pneumatic tire.

Conventionally, as a pneumatic tire, there has been known a pneumatic tire where a square shoulder and a taper cut shoulder are alternately arranged in a shoulder region along a tire circumferential direction (see JP H8-127206 A, for example).

Further, as another pneumatic tire, there has been known a pneumatic tire where a size of the tire in a tire width direction is equal, and shoulder blocks which are arranged parallel to each other in a tire circumferential direction are arranged in a state where an edge portion on a shoulder side and an edge portion on a tire equator side are positionally displaced from each other in the tire width direction (see JP 2003-165311 A, for example).

As still another pneumatic tire, there has been disclosed a pneumatic tire having the configuration where a shoulder block is divided into a main part on a tire equator side and a fine land portion disposed outside the main part by forming fine grooves on the shoulder block (see JP 2003-341305 A, for example).

However, in all pneumatic tires described above, neither traction performance nor non-uniform wear resistance of the tire is taken into consideration.

SUMMARY OF THE INVENTION

It is an object of the present invention to provide a pneumatic tire having excellent traction performance and excellent non-uniform wear resistance.

To overcome the above-mentioned drawbacks, according to one aspect of the present invention, there is provided a pneumatic tire on which a plurality of blocks are formed by a plurality of main grooves extending in a tire circumferential direction and a plurality of transverse grooves extending in a tire width direction. In the pneumatic tire, a first block and a second block disposed adjacently to each other in the tire circumferential direction are formed as one set. A surface area of the second block is set larger than a surface area of the first block, and the second block is arranged such that a position of the second block is displaced from a position of the first block toward the inside in the tire width direction.

With such a configuration, the surface area of the second block whose ground contact area with a road surface is increased can be increased and hence, rigidity of the second block can be increased. Accordingly, although an edge length along which the second block is brought into contact with the road surface becomes large compared to the first block, the wear of the second block can be suppressed.

Assuming the surface area of the first block on a ground contact surface as A and the surface area of the second block on a ground contact surface as B, it is preferable that a following relationship be satisfied.

$$1.01 \times A \leq B \leq 1.10 \times A$$

With such a configuration, rigidity of a kick-out portion of the second block can be set to a proper value. That is, when the surface area of the second block is less than a value 1.01 times as large as the surface area of the first block, rigidity of the second block becomes insufficient. On the other hand, when the surface area of the second block is more than a value 1.10 times as large as the surface area of the first block, rigidity of the second block becomes excessively high so that the pneumatic tire generates slipping.

It is preferable that an angle θ1 made by a side surface of the first block which forms a portion of the transverse groove and a ground contact surface be set substantially equal to an angle θ2 made by a side surface of the second block which forms a portion of the transverse groove and the ground contact surface.

With such a configuration, it is possible to prevent the generation of the difference in rigidity between the first block and the second block caused by the difference in the angle made by the side surface and the ground contact surface. That is, the difference in rigidity between the first block and the second block can be set based on only the difference in the surface area.

In this case, it is sufficient that the angle θ1 and the angle θ2 be set so as to satisfy a following relationship.

$$0.98 \times \theta1 \leq \theta2 \leq 1.20 \times \theta1$$

It is preferable that a size of positional displacement α between the first block and the second block in the tire width direction satisfy a following relationship.

$$2 \text{ mm} \leq \alpha \leq 5 \text{ mm}$$

With such a configuration, the pneumatic tire of the present invention can ensure desired traction performance.

According to the present invention, a surface area of the second block which is arranged in a positionally displaced manner toward the inside in the tire width direction is set large compared to the first block and hence, the pneumatic tire can suppress non-uniform wear on an edge of the second block while traction performance is maintained.

BRIEF DESCRIPTION OF THE DRAWINGS

The foregoing and the other feature of the present invention will become apparent from the following description and drawings of an illustrative embodiment of the invention in which.

DETAILED DESCRIPTION OF THE PREFERRED EMBODIMENT

Hereinafter, embodiments according to the present invention are described with reference to attached drawings. The description made hereinafter is provided substantially for merely exemplifying the present invention, and the description does not intend to limit the present invention, a product to which the present invention is applied or a usage where the present invention is used. Further, the drawings are schematic drawings, and the ratios between the respective sizes and the like may differ from actual corresponding ratios.

Figure 1:
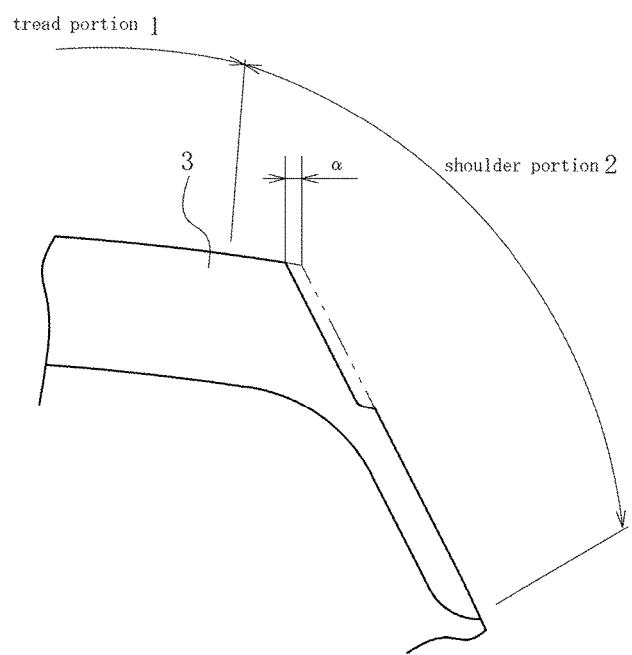
FIG. 1 shows profile of a portion of a pneumatic tire according to the present embodiment.

FIG. 1 is a schematic view showing profile of a portion of a pneumatic tire according to this embodiment. Although not shown in the drawing, the pneumatic tire includes a carcass which extends between a pair of bead cores. The pneumatic tire is reinforced by a belt wound around an outer peripheral side of an intermediate portion of the carcass. The pneumatic tire also includes a tread portion 1 disposed on an outer side of the belt in the tire radial direction, and shoulder portions 2 disposed on both sides of the tread portion 1 (side wall portions and bead portions which are continuously formed with the shoulder portions 2 being omitted from the drawing). The tread portion 1 and portions of the shoulder portions 2 which are continuously formed with the tread portion 1 form a ground contact surface which is brought into contact with a road surface.

Figure 2:
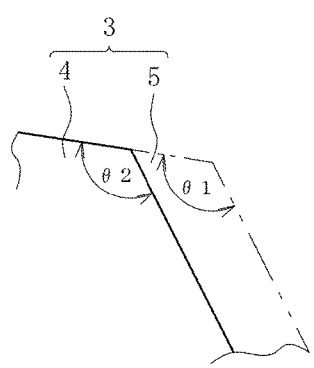
FIG. 2 is a partial enlarged view of FIG. 1.
Figure 3:
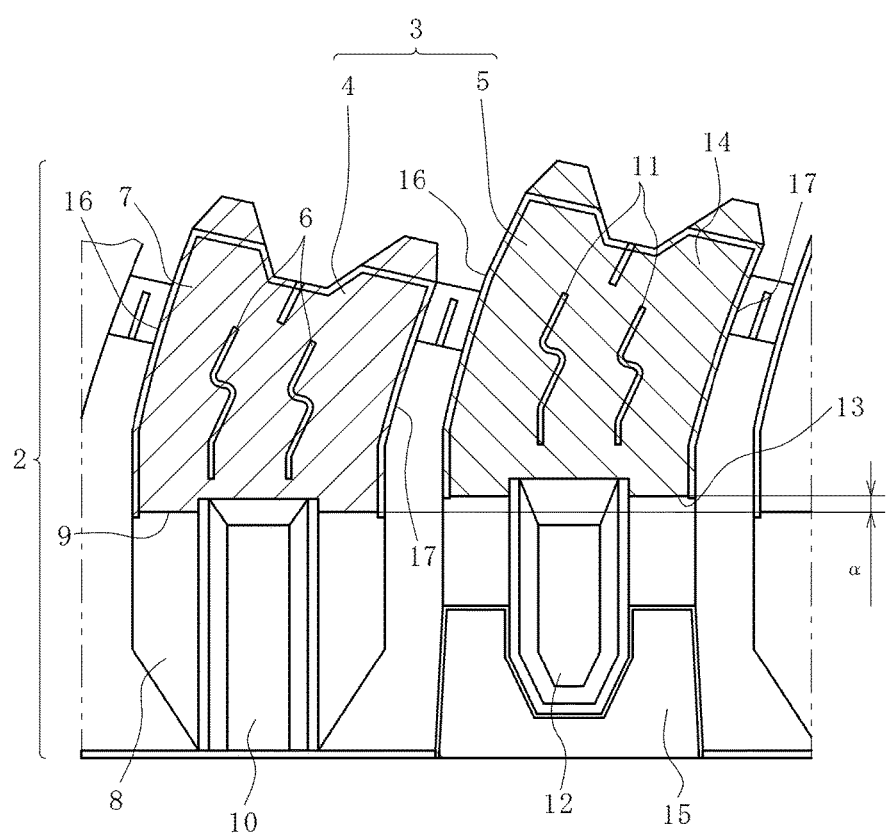
FIG. 3 is a partial developed view of a shoulder portion of FIG. 1.

As shown in FIG. 3, in areas ranging from both sides of the tread portion 1 to the shoulder portions 2 disposed on both sides of the tread portion 1, a plurality of shoulder blocks (Sh blocks 3) which are defined by a plurality of transverse grooves are formed at predetermined intervals along the tire circumferential direction (blocks other than Sh blocks being omitted in FIG. 2). The Sh block 3 is formed of a set of a first Sh block 4 and a second Sh block 5. The Sh block 3 is repeatedly arranged in the tire circumferential direction. An upper side in FIG. 2 shows an inner side (center side) of a tire, and a lower side in FIG. 2 shows an outer side of the tire.

The first Sh block 4 is formed such that one end side of the first Sh block 4 extends toward a tread portion side and is bent in the tire circumferential direction, and a distal end of the first Sh block 4 is bifurcated. A pair of wave-shaped first sipes 6 arranged parallel to each other in the tire circumferential direction is formed on an upper surface of the first Sh block 4 on one end side. The first Sh block 4 extends straight in the tire width direction toward the other end side of the first Sh block 4. An edge (first boundary 9) which separates a first side surface 8 which is a non-ground-contact surface and a first ground contact surface 7 from each other is formed on a middle portion of the first Sh block 4. The first boundary 9 is a corner of the first Sh block 4 which is indicated by a solid line in FIG. 2. A first edge angle θ1 made by the first ground contact surface 7 and the first side surface 8 is set to 118° in this embodiment. A first projecting ridge 10 is formed at a center portion of the first Sh block 4 on the other end side. A width of the first Sh block 4 on the other end portion is gradually narrowed so as to allow the other end portion of the first Sh block 4 to have the same width as the first projecting ridge 10.

The second Sh block 5 has substantially the same configuration as the first Sh block 4. That is, one end side of the second Sh block 5 extends toward a tread portion side and is bent in the tire circumferential direction, and a distal end of the second Sh block 5 is bifurcated. A pair of wave-shaped second sipes 11 is formed on an upper surface of the second Sh block 5 on one end side. Further, a second projecting ridge 12 is formed at a center portion of the second Sh block 5 on the other end side. However, the second Sh block 5 differs from the first Sh block 4 with respect to the following points.

The bifurcated distal end of the second Sh block 5 extends more to the tread portion 1 side than the first Sh block 4 does. Further, an edge (second boundary 13) of the second Sh block 5 is positioned closer to the tread portion 1 side than the first Sh block 4 is. In this embodiment, a size of positional displacement α between the first boundary 9 and the second boundary 13 is set so as to satisfy the relationship of 2 mm≤α≤5 mm so that traction performance is enhanced. When the size of positional displacement α is less than 2 mm, it is difficult for the pneumatic tire to acquire sufficient traction performance which can be acquired by making the first Sh block 4 and the second Sh block 5 positionally displaced from each other. On the other hand, when the size of positional displacement α exceeds 5 mm, there is a possibility that a rubber flow defect occurs at the time of molding a green tire by vulcanization. In a product tire where such a rubber flow defect occurs, there is a possibility that cracks or the like occur due to the stress concentration caused during traveling of a vehicle.

The second boundary 13 of the second Sh block 5 is disposed at a corner of the second Sh block 5 which is indicated by a double-dashed line in FIG. 2. A second edge angle θ2 made by a ground contact surface (second ground contact surface 14) of the second Sh block 5 and a second side surface 15 which is a non-ground-contact surface is set to a value substantially equal to the first edge angle θ1 of the first Sh block 4. That is, the second edge angle θ2 is set so as to satisfy the relationship of 0.98×θ1≤θ2≤1.20×θ1. With such a configuration, it is possible to eliminate a possibility that a difference in rigidity is generated between the first boundary 9 and the second boundary 13 due to a difference in edge angle between the first boundary 9 and the second boundary 13. Accordingly, rigidity of the first Sh block 4 and the second Sh block 5 can be controlled based on only difference between an area of the first Sh block 4 and an area of the second Sh block 5. The second side surface 15 which extends from the second boundary 13 extends substantially parallel to the first side surface 8 of the first Sh block 4 and, thereafter, is bent and is merged with the first side surface 8.

A surface area (second ground contact area B) of the second Sh block 5 on the ground contact surface is set so as to satisfy the relationship of 1.01×A≤B≤1.10×A with respect to a surface area (first ground contact area A) of the first Sh block 4 on the ground contact surface area. When the second ground contact area B is less than a value 1.01 times as large as the first ground contact area A, rigidity of the second Sh block 5 cannot be enhanced so much or rigidity of the second Sh block 5 becomes lower than rigidity of the first Sh block 4 to the contrary. In such a state, the wear cannot be suppressed on the second Sh block 5 where a length of an edge portion on a tire step-in side (step-in edge 16) and a length of an edge portion on a kick-out side (kick-out edge 17) are longer than those of the first Sh block 4. On the other hand, when the second ground contact area B is more than a value 1.10 times as large as the first ground contact area A, rigidity of the second Sh block 5 becomes excessively large so that the pneumatic tire generates slipping during traveling of a vehicle. By setting the area ratio between the first ground contact area A and the second ground contact area B to the predetermined value described above, rigidity of the second Sh block 5 is increased compared to rigidity of the first Sh block 4. Accordingly, while the generation of non-uniform wear is suppressed, it is possible to prevent the generation of slipping during traveling of a vehicle.

In this manner, by arranging the first Sh block 4 and the second Sh block 5 such that the position of the first Sh block 4 is displaced toward the outside in the tire width direction and the position of the second Sh block 5 is displaced toward the inside in the tire width direction, traction performance of the pneumatic tire is enhanced. Further, it is designed that the second ground contact area B of the second Sh block 5 is larger than the first ground contact area A of the first Sh block 4. With such a configuration, rigidity of the second Sh block 5 becomes higher than rigidity of the first Sh block 4 so that non-uniform wear at the step-in edge 16 and the kick-out edge 17 can be suppressed. That is, in the second Sh block 5, a length of the step-in edge 16 and a length of the kick-out edge 17 are longer than those of the first Sh block 4 so that the second Sh block 5 is liable to be worn. However, by increasing rigidity of the second Sh block 5, it is possible to compensate for the tendency of the tire to easily wear.

EXAMPLE

LT265/70R17 was used as a tire to be evaluated. After a vehicle traveled for 12000 km, a T/H amount of a tire was measured using BYTEWISE. In the measurement, the closer a difference in a T/H amount between blocks to 0, the more uniform a wear state between the blocks is.

In a comparison example 1, a ground contact area of a first Sh block 4 and a ground contact area of a second Sh block 5 were set equal to each other, a difference in edge angle between the first Sh block 4 and the second Sh block 5 was set to 5°, and a size of positional displacement between a boundary in the first Sh block 4 and a boundary in the second Sh block 5 was set to 5 mm.

In a comparison example 2, a ground contact area of a second Sh block 5 was set to a value 1.2 times as large as a ground contact area of a first Sh block 4, a difference in edge angle between the first Sh block 4 and the second Sh block 5 was set to 5°, and a size of positional displacement between a boundary in the first Sh block 4 and a boundary in the second Sh block 5 was set to 5 mm.

In a comparison example 3, a ground contact area of a second Sh block 5 was set to a value 0.9 times as large as a ground contact area of a first Sh block 4, a difference in edge angle between the first Sh block 4 and the second Sh block 5 was set to 5°, and a size of positional displacement between a boundary in the first Sh block 4 and a boundary in the second Sh block 5 is set to 5 mm.

In a comparison example 4, a ground contact area of a second Sh block 5 was set to a value 1.21 times as large as a ground contact area of a first Sh block 4, a difference in edge angle between the first Sh block 4 and the second Sh block 5 was set to 5°, and a size of positional displacement between a boundary in the first Sh block 4 and a boundary in the second Sh block 5 was set to 5 mm.

In a comparison example 5, a ground contact area of a second Sh block 5 was set to a value 0.95 times as large as a ground contact area of a first Sh block 4, a difference in edge angle between the first Sh block 4 and the second Sh block 5 was set to 5°, and a size of positional displacement between a boundary in the first Sh block 4 and a boundary in the second Sh block 5 was set to 5 mm.

In an example 1, a ground contact area of a second Sh block 5 was set to a value 1.10 times as large as a ground contact area of a first Sh block 4, a difference in edge angle between the first Sh block 4 and the second Sh block 5 was set to 0°, and a size of positional displacement between a boundary in the first Sh block 4 and a boundary in the second Sh block 5 was set to 5 mm.

In an example 2, a ground contact area of a second Sh block 5 was set to a value 1.01 times as large as a ground contact area of a first Sh block 4, a difference in edge angle between the first Sh block 4 and the second Sh block 5 was set to 0°, and a size of positional displacement between a boundary in the first Sh block 4 and a boundary in the second Sh block 5 was set to 5 mm.

In an example 3, a ground contact area of a second Sh block 5 was set to a value 1.06 times as large as a ground contact area of a first Sh block 4, a difference in edge angle between the first Sh block 4 and the second Sh block 5 was set to 0°, and a size of positional displacement between a boundary in the first Sh block 4 and a boundary in the second Sh block 5 was set to 5 mm.

TABLE 1

|  | comparison example 1 | comparison example 2 | comparison example 3 | comparison example 4 | comparison example 5 |
|---|---|---|---|---|---|
| non-uniform wear resistance | 2 | 1.5 | 1.5 | 1.5 | 1.5 |

|  | example 1 | Example 2 | Example 3 |
|---|---|---|---|
| non-uniform wear resistance | 1 | 1 | 0 |

As can be clearly understood from Table 1, by setting a ground contact area of the first Sh block 4 and a ground contact area of the second Sh block 5 to values which fall within proper ranges and also by eliminating a difference in edge angle, non-uniform wear resistance can be enhanced. Particularly, by setting each ground contact area to a center value in a set range, an effect of enhancing non-uniform wear resistance can be further increased.

What is claimed is:

1. A pneumatic tire on which a plurality of blocks are formed by a plurality of main grooves extending in a tire circumferential direction and a plurality of transverse grooves extending in a tire width direction, wherein
   the blocks include shoulder blocks which are formed on both sides in the tire width direction and aligned in a tire circumferential direction, and the shoulder blocks are formed by a plurality of sets of a first shoulder block and a second shoulder block that are disposed adjacently to each other in the tire circumferential direction,
   a surface area of the second shoulder block is set larger than a surface area of the first shoulder block, wherein
   the first shoulder block includes a first boundary separating a first side surface which is a non-ground-contact surface and a first ground contact surface from each other,
   the second shoulder block includes a second boundary separating a second side surface which is a non-ground-contact surface and a second ground contact surface from each other, and
   the first boundary is positioned on an inner side in the tire width direction with respect to the second boundary.

2. The pneumatic tire according to claim 1, wherein assuming the surface area of the first shoulder block on a ground contact surface as A and the surface area of the second shoulder block on a ground contact surface as B, a following relationship is satisfied $$1.01 \times A \leq B \leq 1.10 \times A.$$

3. The pneumatic tire according to claim 1, wherein an angle θ1 made by a side surface of the first shoulder block which forms a portion of the transverse groove and a ground contact surface is set substantially equal to an angle θ2 made by a side surface of the second shoulder block which forms a portion of the transverse groove and the ground contact surface.

4. The pneumatic tire according to claim 1, wherein the angle θ1 and the angle θ2 are set so as to satisfy a following relationship $$0.98 \times \theta1 \leq \theta2 \leq 1.20 \times \theta1.$$

5. The pneumatic tire according to claim 2, wherein the angle θ1 and the angle θ2 are set so as to satisfy a following relationship $$0.98 \times \theta1 \leq \theta2 \leq 1.20 \times \theta1.$$

6. The pneumatic tire according to claim 3, wherein the angle θ1 and the angle θ2 are set so as to satisfy a following relationship $$0.98 \times \theta1 \leq \theta2 \leq 1.20 \times \theta1.$$

7. The pneumatic tire according to claim 1, wherein a size difference α between a position of the first shoulder block and a position of the second shoulder block in the tire width direction satisfies a following relationship $$2 \text{ mm} \leq \alpha \leq 5 \text{ mm}.$$

8. The pneumatic tire according to claim 2, wherein a size difference α between a position of the first shoulder block and a position of the second shoulder block in the tire width direction satisfies a following relationship $$2 \text{ mm} \leq \alpha \leq 5 \text{ mm}.$$

9. The pneumatic tire according to claim 3, wherein a size wherein a size difference α between a position of the first shoulder block and a position of the second shoulder block in the tire width direction satisfies a following relationship $$2 \text{ mm} \leq \alpha \leq 5 \text{ mm}.$$

10. The pneumatic tire according to claim 4, wherein a size difference α between a position of the first shoulder block and a position of the second shoulder block in the tire width direction satisfies a following relationship $$2 \text{ mm} \leq \alpha \leq 5 \text{ mm}.$$

11. The pneumatic tire according to claim 5, wherein a size difference α between a position of the first shoulder block and a position of the second shoulder block in the tire width direction satisfies a following relationship $$2 \text{ mm} \leq \alpha \leq 5 \text{ mm}.$$

12. The pneumatic tire according to claim 6, wherein a size difference α between a position of the first shoulder block and a position of the second shoulder block in the tire width direction satisfies a following relationship $$2 \text{ mm} \leq \alpha \leq 5 \text{ mm}.$$

* * * * *